United States Patent [19]

Niwano et al.

[11] Patent Number: 5,563,216
[45] Date of Patent: Oct. 8, 1996

[54] THERMOPLASTIC RESIN COMPOSITION AND PREPARATION THEREOF

[75] Inventors: Masahiro Niwano, Ibaraki; Yukinori Dairaku, Chiba, both of Japan

[73] Assignee: Sumitomo Chemical Company, Limited, Osaka, Japan

[21] Appl. No.: 971,833

[22] PCT Filed: Jun. 17, 1992

[86] PCT No.: PCT/JP92/00774

§ 371 Date: Feb. 19, 1993

§ 102(e) Date: Feb. 19, 1993

[30] Foreign Application Priority Data

Jun. 19, 1991 [JP] Japan .................................. 3-176122

[51] Int. Cl.$^6$ ............................ C08L 33/00; C08L 35/00; C08L 37/00; C08L 51/06
[52] U.S. Cl. ............................ 525/65; 525/66; 525/68; 525/109; 525/131; 525/132
[58] Field of Search .............................. 525/68, 65, 109, 525/132, 66, 131

[56] References Cited

U.S. PATENT DOCUMENTS 5,171,778  12/1992  Dekkers ........................ 525/65
5,324,795  6/1994  Suenaga ........................ 525/444

FOREIGN PATENT DOCUMENTS

| 7543223 | 8/1975 | Japan . |
| 54-077691 | 6/1979 | Japan . |
| 1-121357 | 5/1989 | Japan . |
| 1-193351 | 8/1989 | Japan . |
| 2-80446 | 3/1990 | Japan . |

OTHER PUBLICATIONS

G. Kiss (1987), *Polymer Engineering and Science*, 27 (6):410–423.

*Primary Examiner*—Patricia A. Short
*Attorney, Agent, or Firm*—Birch, Stewart, Kolasch & Birch, LLP

[57] ABSTRACT

A thermoplastic resin composition containing (A) a liquid crystalline polyester and a reaction product of (B) a thermoplastic polymer having a crosslinkable functional group and (C) a crosslinking agent, in which a volume ratio of the polyester (A) to the polymer (B) is from 20:80 to 50:50 and the polyester (A) forms a continuous phase, and a method for producing the same. This composition is cheap and has good properties of the liquid crystalline polyester even in a composition range in which a ratio of the liquid crystalline polyester is small.

6 Claims, 8 Drawing Sheets

FIG. 1

1 LCP
2 LCP/E-EA-MAh + BAPP (Example 1)
3 LCP/E-EA-MAh (Comparative Example 1)
4 E-EA-MAh

FIG. 2

1 LCP
5 LCP/M-HDPE + BAPP (Example 2)
6 LCP/M-HDPE (Comparative Example 2)
7 M-HDPE

FIG. 3

1 LCP
8 LCP/St-MAh + BAPP (Example 3)
9 LCP/St-MAh (Comparative Example 3)
10 St-MAh

FIG. 4

1  LCP
11 LCP/St-MAA+ELM434 (Example 4)
12 LCP/St-MAA (Comparative Example 4)
13 St-MAA

FIG. 5

1   LCP
14  LCP/St-MAh+BAPP (Example 5)
15  LCP/St-MAh (Comparative Example 5)
10  St-MAh

FIG. 6

1  LCP
16 LCP/St-MAA + B-MDI (Example 6)
17 LCP/St-MAA (Comparative Example 6)
13 St-MAA

THERMOPLASTIC RESIN COMPOSITION AND PREPARATION THEREOF

FIELD OF THE INVENTION

The present invention relates to a thermoplastic resin composition which is excellent in heat resistance and mechanical properties and economical.

DESCRIPTION OF PRIOR ART

In these years, basic and application researches on liquid crystalline polymers have been done vigorously. For instance, a copolymer of p-hydroxybenzoic acid and 6-hydroxy-2-naphthoic acid (Japanese Patent Kokai Publication No. 77691/1979), and a copolymer of p-hydroxybenzoic acid, 4,4'-dihydroxybiphenyl, terephthalic acid and isophthalic acid (Japanese Patent Publication No. 24407/1982) are exemplified. These liquid crystalline polymers have good flowability, heat resistance, stiffness and dimensional accuracy, but are expensive. Therefore, their application fields are limited.

While general-purpose thermoplastic resins are cheaper than liquid crystalline polyesters, the former have less heat resistance and stiffness than the latter. To find new application fields of the thermoplastic resins, it is necessary to improve their properties. As one of methods for improving the properties, blending of a reinforcing material such as calcium carbonate and glass fiber is known. However, since the blending of reinforcing material increases a specific gravity of the resin, a merit of light weight of the resin which is one of the characteristics of the resin is decreased, or a molded article has poor appearance. In addition, a molding machine is heavily abrased during molding. Then, the blend of reinforcing material causes various problems in practical application.

To solve such problems, it is tried to improve flowability and stiffness of the thermoplastic resin by blending the liquid crystalline polyester in the resin. One example is reported by J. Kis in Polym. Eng. Sci., 27 (1987) 410. However, such blend composition has poor compatibility between the liquid crystalline polyester and the thermoplastic resin. Since the thermoplastic resin forms a continuous phase in a composition range in which a ratio of the liquid crystalline polyester is small, the liquid crystalline polyester does not sufficiently exert its excellent properties.

SUMMARY OF THE INVENTION

An object of the present invention is to provide an economical thermoplastic resin composition which has excellent properties of a liquid crystalline polyester though its composition is in a range in which a ratio of the liquid crystalline polyester is small.

The present inventors have extensively carried out researches to develop a thermoplastic resin composition comprising a liquid crystalline polyester and a thermoplastic resin which composition has excellent properties of the liquid crystalline polyester in a composition range in which a ratio of the liquid crystalline polyester is small, and completed the present invention.

Accordingly, the present invention relates to a thermoplastic resin composition comprising (A) a liquid crystalline polyester and a reaction product of (B) a thermoplastic polymer having a crosslinkable functional group and (C) a crosslinking agent, wherein a volume ratio of the polyester (A) to the polymer (B) is from 20:80 to 50:50 and the polyester (A) forms a continuous phase, and a method for preparing the same.

Further, the present invention relates to a thermoplastic resin composition wherein a crosslinked material of the polymer (B) with the crosslinking agent (C) forms a discontinuous phase.

Herein, a reaction between the crosslinkable functional group and the cross linking agent is preferably a condensation reaction or an addition reaction.

DETAILED DESCRIPTION OF THE INVENTION

In the present invention, amounts of the liquid crystalline polyester (A) and the crosslinkable thermoplastic polymer (B) are 20 to 50% by volume and 80 to 50% by volume, respectively. When the amount of the polyester (A) is less than 20% by volume, the polyester (A) cannot form a continuous phase. When the amount of the polyester (A) exceeds 50% by volume, a high cost of the resin composition due to the use of a large amount of the polyester (A) causes some problem unpreferably.

An amount of the crosslinking agent (C) is preferably from 0.01 to 50 parts by weight, more preferably from 0.05 to 30 parts by weight per 100 parts by weight of the polymer (B).

The liquid crystalline polyester (A) has a flow temperature of 160° to 350° C., preferably 165° to 325° C., more preferably 170° to 270° C. when measured by the following method.

Flow temperature

A temperature at which a melt viscosity reaches 48,000 poise when a resin melt is extruded from a nozzle having an inner diameter of 1 mm and a length of 10 mm of a capillary rheometer under a load of 100 kg/cm$^2$ while heating at a heating rate of 4° C./min.

As the liquid crystalline polyester, a polyester comprising a repeating unit (III), or repeating units (I) and (II), or (I), (II) and (III):

wherein $R_1$ is at least one group selected from the group consisting of $R_2$ is at least one group selected from the group consisting of and $R_3$ is at least one group selected from the group consisting of provided that a part of hydrogen atoms on a benzene ring of the aromatic hydrocarbon group in any of $R_1$, $R_2$ and $R_3$ may be substituted by a halogen atom, an aryl group, or a $C_1$–$C_{10}$ alkyl or alkoxy group.

Examples of dicarboxylic acids which provide the repeating unit (I) are terephthalic acid, methoxyterephthalic acid, ethoxyterephthalic acid, fluoroterephthalic acid, chloroterephthalic acid, bromoterephthalic acid, methylterephthalic acid, isophthalic acid, methoxyisophthalic acid, biphenyl-4,4'-dicarboxylic acid, diphenylether-4,4'-dicarboxylic acid, naphthalene-2,6-dicarboxylic acid, naphthalene-1,5-dicarboxylic acid, naphthalene-1,4-dicarboxylic acid, and the like. They may be used as a mixture of two or more of them. Among them, terephthalic acid, isophthalic acid and biphenyl-4,4'-dicarboxylic acid are preferred.

Examples of dihydroxy compounds which provide the repeating unit (II) are ethylene glycol, 1,3-propanediol, 1,2-propanediol, 1,3-butanediol, 1,4-butanediol, 1,6-hexanediol, 1,12-dodecanediol, cyclohexane-1,4-diol, cyclohexane-1,3-diol, cyclohexane-1,2-diol, 1,4-dioxymethylcyclohexane, 4,4'-dihydroxybiphenyl, hydroquinone, resorcinol, methylhydroquinone, tert.-butylhydroquinone, chlorohydroquinone, phenylhydroquione, 2,6-dihydroxynaphthalene, 2,7-dihydroxynaphthalene, and the like. They may be used as a mixture of two or more of them. Among them, 4,4'-dihydroxybiphenyl, hydroquinone and resorcinol are preferred.

Examples of hydroxycarboxylic acids which provide the repeating unit (III) are p-hydroxybenzoic acid, 4-hydroxy-3-chlorobenzoic acid, 4-hydroxy-3-methylbenzoic acid, m-hydroxybenzoic acid, 4-hydroxy-3,5-dimethylbenzoic acid, 2-hydroxy-6-naphthoic acid, 1-hydroxy-5-naphthoic acid, 1-hydroxy-4-naphthoic acid, polyethylene terephthalate, polybutyrene terephthalate, and the like. They may be used as a mixture of two or more of them. Among them, p-hydroxybenzoic acid and 2-hydroxy-6-naphthoic acid are preferred.

There is no specific limitation on a ratio of the repeating units of the liquid crystalline polyester. When it comprises the repeating units (I), (II) and (III), a total amount of dicarboxylic acid repeating units (I) and dihydroxy repeating units (II) is from 20 to 90% by mole, preferably from 30 to 80% by mole based on the whole mole of the repeating units, and an amount of the hydorxycarboxylic acid repeating units (II) is from 80 to 10% by mole, preferably from 70 to 20% by mole based on the whole mole of the repeating units.

It may be possible to copolymerize a diamino compound, a hydroxyamino compound or an aminocarboxylic acid with the above repeating units. Example of such compounds are m- or p-phenylenediamine, m- or p-aminophenol, p-aminobenzoic acid, and the like. They may be used as a mixture of two or more of them.

The polyester comprising the above repeating units should have a liquid crystalline property and preferably an optical anisotropy at a temperature not higher than 350° C.

The above liquid crystalline polyester can be prepared according to any of known polyester polymerization processes in the presence or absence of a catalyst. Non-limited examples of the polymerization are as follows:

(1) Polycondensation reaction with acetic acid-elimination of an acylated compound of an aromatic hydroxycarboxylic acid (e.g. p-hydroxybenzoic acid, etc.) or an aromatic dihydroxy compound (e.g. 4,4'-dihydroxybiphenyl, etc.) with acetic anhydride and an aromatic dicarboxylic acid (e.g. terephthalic acid, etc.).

(2) Polycondensation reaction with phenol-elimination of a phenyl ester of an aromatic hydroxycarboxylic acid (e.g. p-hydroxybenzoic acid, etc.), or an aromatic dicarboxylic acid (e.g. terephthalic acid, etc.) and an aromatic dihydroxy compound (e.g. 4,4'-dihydroxybiphenyl, etc.).

(3) Polycondensation reaction (1) in the presence of a polyester prepared from a divalent aliphatic diol (e.g. ethylene glycol, etc.) and an aromatic dicarboxylic acid (e.g. terephthalic acid, etc.).

(4) Polycondensation with acetic acid-elimination of an acylated compound of an aromatic hydroxycarboxylic acid (e.g. p-hydroxybenzoic acid, etc.) with acetic anhydride.

The thermoplastic polymer having a crosslinkable functional group (B) includes (1) a thermoplastic polymer which is modified with a compound having a crosslinkable functional group and (2) a copolymer of a compound having a crosslinkable functional group with an olefin and/or an olefinically unsaturated compound.

As the thermoplastic polymer in the former polymer (1), any modifiable thermoplastic polymer can be used. Specific examples are crystal or amorphous polyolefins.

Examples of the polyolefin are polymers of olefins themselves such as polypropylene, high density polyethylene, low density polyethylene, linear low density polyethylene, propylene-ethylene copolymer, ethylene-butene-1 copolymer, ethylene-pentene-1 copolymer, ethylene-hexene-1 copolymer, poly-4-methylpentene-1, etc., and copolymers comprising a predominant amount of the olefin or olefins and a vinyl monomer copolymerizable therewith (e.g. acrylate esters, methacrylate esters, vinyl acetate, styrene, acrylonitrile, glycidyl acrylate, glycidyl methacrylate, etc.).

The copolymer may be any one of random, block and graft copolymers. They may be used independently or as a mixture of two or more of them.

Among them, polypropylene and polyethylene are preferred.

Examples of the compound having the crosslinkable functional group in the former polymer (1) are compounds having both (a) a carbon-carbon double bond or a carbon-carbon triple bond and (b) at least one functional group selected from the group consisting of a carboxylic acid group, an acid anhydride group, an acid amide group, an imide group, an epoxy group and a carboxylic acid ester group.

Examples of the modifier having the above functional group or groups are maleic anhydride, maleic acid, fumaric acid, maleimide, maleic acid hydrazide, a reaction product of maleic anhydride and diamine such as a compound of the formula:

methylnadic anhydride, dichloromaleic anhydride, maleic acidamide, natural oils (e.g. soya bean oil, tung oil, caster oil, linseed oil, hemp-seed oil, cotton-seed oil, sesame oil, rape oil, peanut oil, TSUBAKI oil and sardine oil), epoxydated natural oils (e.g. epoxydated soya bean oil), unsaturated carboxylic acids (e.g. acrylic acid, butenoic acid, crotonic acid, vinylacetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2'-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenic acid, 2,4-pentadienoic acid, 2,4-hexadienoic acid, diallylacetic acid, geranic acid, 2,4-decadienoic acid, 2,4-dodecadienoic acid, 9,12-hexadecadienoic acid, 9,12-octadecadienoic acid, hexadecatrienoic acid, linoleic acid, linolenic acid, octadecatrienoic acid, eicosadienoic acid, eicosatrienoic acid, eicosatetraenoic acid, ricinoleic acid, eleostearic acid, oleic acid, eicosapentaenoic acid, erucinic acid, docosadienoic acid, docosatrienoic acid, docosatetraenoic acid, docosapentaenoic acid, tetracosenoic acid, hexacosenoic acid, hexacodienoic acid, octacosenoic acid, triacontenoic acid, etc.), esters of these unsaturated carboxylic acids such as alkyl esters (e.g. methyl, ethyl, butyl esters, etc.), aryl esters (e.g. phenyl ester, etc.) or glycidyl esters (e.g. glycidyl acrylate, glycidyl methacrylate, etc.), their acid amides or anhydrides, and the like. They may be used independently or as a mixture of two or more of them.

Among them, maleic anhydride, maleic acid, acrylic acid and methacrylic acid are preferred.

In the present invention, it is possible to use the above modifier in combination with a vinyl compound such as styrene or p-hydroxystyrene.

An amount of the modifier is from 0.01 to 30 parts by weight, preferably from 0.05 to 20 parts by weight, more preferably from 0.1 to 10 parts by weight per 100 parts by weight of the thermoplastic polymer.

When a main chain of the thermoplastic polymer has a crosslinkable functional group, an amount of such crosslinkable functional group is included in the above amount.

When the polyolefin is modified with the above described modifier, a radical generator may be optionally used.

As the radical generators, known organic peroxides, diazo compounds, and the like can be used. Preferred examples are benzoyl peroxide, dicumyl peroxide, di-tert.-butyl peroxide, tert.-butylcumyl peroxide, tert.-butyl hydroperoxide, 1,3-bis(tert.-butylperoxyisopropyl)benzene, cumene hydroperoxide, azobisisobutyronitrile, and the like.

An amount of the radical generator is usually from 0.01 to 10 parts by weight, preferably from 0.1 to 5 parts by weight per 100 parts by weight of the thermoplastic polymer.

The modified thermoplastic polymer may be prepared by a conventional method. For example, (i) the thermoplastic polymer and the above modifier are homogeneously mixed using a high speed agitator and the like and melt kneaded, or (ii) the thermoplastic polymer and the above modifier are dissolved in or swelled with a suitable solvent and heated while stirring.

In the above method (i), there is no limitation on a melt kneading temperature or time. Usually, a temperature is in a range between 120° C. and 350° C.

As a kneading apparatus, any one that can process a viscous liquid can be used. Either one of a batchwise type apparatus and a continuous type apparatus may be used. Specific examples are single or multi screw extruder, a Banbury mixer, a laboplasto mill, a roll kneader, and the like.

The solvent to be used in the method (ii) is not limited. Any solvent can be used insofar as the thermoplastic polymer can be dissolved in or swelled with it. A mixed solvent may be used. A heating temperature is usually from 20° to 250° C., and a heating time is from 30 seconds to 10 hours.

As the thermoplastic polymer having the crosslinkable functional group, there is exemplified a copolymer of a compound having a crosslinkable functional group and at least one compound selected from the group consisting of olefins, olefinically unsaturated compounds and aromatic vinyl compounds.

Herein, the compound having the crosslinkable functional group is a compound having both (a) a carbon-carbon double bond or a carbon-carbon triple bond and (b) at least one functional group selected from the group consisting of a carboxylic acid group, an acid anhydride group, an acid amide group, an imide group, an epoxy group and a carboxylic acid ester group.

The olefins include ethylene, propylene and butene-1.

The olefinically unsaturated compounds include vinyl esters of $C_2$–$C_6$ saturated carboxylic acids, esters of $C_1$–$C_8$ saturated alcohols with acrylic acid or methacrylic acid, maleate esters, fumarate esters, halogenated vinyl compounds, nitriles and vinyl ethers.

Specific examples are vinyl acetate, methyl acrylate, ethyl acrylate, methyl methacrylate, diethyl maleate, diethyl fumarate, vinyl chloride, vinylidene chloride, acrylonitrile, isobutyl vinyl ether and acrylamide. One of them or two or more of them may be copolymerized with the compound having the crosslinkable functional group.

The aromatic vinyl compounds include styrene, α-methylstyrene, vinyltoluene, vinylnaphthalene and styrenes having a substituent on a nucleus.

Preferred examples of the copolymer of the compound having the crosslinkable functional group and at least one compound selected from olefins, olefinically unsaturated compounds and aromatic vinyl compounds are ethylene-maleic anhydride copolymer, ethylene-methyl acrylate-maleic anhydride copolymer, ethylene-ethyl acrylate-maleic anhydride copolymer, styrene-acrylic acid copolymer, styrene-methacrylic acid copolymer, styrene-maleic anhydride copolymer, and the like.

An amount of the compound having the crosslinkable functional group to be used in the copolymerization is preferably from 0.1 to 50 parts by weight, more preferably from 0.5 to 30 parts by weight per 100 parts by weight of at least one compound selected from olefins, olefinically unsaturated compounds and aromatic vinyl compounds.

The copolymer may be prepared by various methods without specific limitation.

As the crosslinking agent (C), polyfunctional (that is, having two or more functional groups) amines, carboxylic acids, epoxy compounds, isocyanates, and the like are exemplified.

Specific examples are 4,4'-diaminodiphenylmethane, 4,4'-diaminodiphenyl ether, 1,4-bis(4-aminophenoxy)benzene, 2,2'-bis-4(4-aminophenoxy)phenylpropane, 1,4-bis-2(4-aminophenyl)isopropylbenzene, 2,4,6-triaminopyrimidine, tris(2-aminoethyl)amine, aniline novolak, malonic acid, succinic acid, adipic acid, trimellitic acid, a glycidyl ether compound of o-cresol novolak, N,N,N',N'-tetraglycidyldiaminodiphenylmethane, a glycidyl ether compound prepared by reacting bisphenol A and epichlorohydrin, and a blocked isocyanate compound prepared by reacting ε-caprolactam with 2,4-tolylenediisocyanate or 4,4-diphenylmethanediisocyanate.

An amount of the crosslinking agent (C) is preferably from 0.01 to 50 parts by weight, more preferably from 0.05 to 30 parts by weight per 100 parts by weight of the polymer (B).

The thermoplastic resin composition of the present invention can be prepared by, for example, melt kneading 20 to 50% by volume of the liquid crystalline polyester (A) and 80 to 50% by volume of the thermoplastic polymer having the crosslinkable functional group (B) at a temperature at which both the polyester (A) and the polymer (B) are molten, adding the crosslinking agent (C), and again melt kneading the mixture.

More preferably, the polyester (A) and the polymer (B) are melt kneaded at a temperature at which both polymers are molten and a melt viscosity of the polyester (A) is larger than that of the polymer (B), the crosslinking agent is added, and the mixture is further melt kneaded.

In connection with a crosslinking degree of the crosslinked material obtained by further kneading the mixture after the addition of crosslinking agent, the mixture is crosslinked to a degree that a viscosity of the crosslinked material obtained by further kneading the mixture after the addition of crosslinking agent is higher than the viscosity of the polyester (A).

Thereby, it is possible to obtain the resin composition which maintains the excellent properties of the liquid crystalline polyester (A) at a higher level. The reason for this has not been clarified. It is assumed that, when the crosslinkable polymer is crosslinked with the crosslinking agent, it may form a more finely divided discontinuous phase.

The crosslinked material may be a partially crosslinked one.

The preparation method of the present invention provides the resin composition in which the polyester (A) forms the continuous phase even in a range in which the content of the liquid crystalline polyester (A) is as low as 20 to 50% by volume. When a suitable temperature is selected depending on a combination of the polyester (A) and the polymer (B), it is possible to obtain the resin composition in which the crosslinked material of the polymer (B) with the crosslinking agent forms the discontinuous phase, whereby the resin composition exerts the excellent properties of the liquid crystalline polyester (A) more effectively.

Depending on the combination of the polyester (A) and the polymer (B), a melt kneading time of these polymers is preferably from 1 to 10 minutes.

The kneading time after the addition of crosslinking agent depends on the combination of the polymer (B) and the crosslinking agent (C) and is preferably from 1 to 60 minutes.

To knead the resin composition of the present invention in a molten state, in general, a kneading apparatus such as a single or twin screw extruder, a laboplasto mill, a Brabender Plastograph, and the like can be used. In particular, the laboplasto mill and twin screw extruder are preferred.

Before kneading, preferably the polyester (A) and the polymer (B) are homogeneously premixed both in a powder or pellet form by an apparatus such as a tumbling mixer or a Henschel mixer.

To accelerate a crosslinking reaction of the polymer (B) in the melt kneading step, it may be possible to add a suitable catalyst such as triphenylphosphine, a tertiary amine and the like.

To work the present invention, it is possible to add an additive to the resin composition of the present invention. Examples of the additive are a reinforcing material such as glass fiber, silica-alumina fiber, alumina fiber, carbon fiber, potassium titanate fiber and high-modulus polyamide fiber; an inorganic filler such as carbon black, silica, titania, talc, calcium carbonate, magnesium sulfate and wollastonite; a lubricant; a stabilizer; a flame retardant such as antimony trioxide, a halogen compound and a phosphate ester; a dye; a pigment; and the like.

EFFECTS OF THE INVENTION

According to the present invention, in the composition range in which the ratio of the liquid crystalline polyester (A) is small, it is possible to provide the resin composition having the excellent properties of liquid crystalline polyester (A) at a low cost, and the resin composition is technically advantageous.

PREFERRED EMBODIMENTS OF THE INVENTION

The present invention will be illustrated by the following Examples, which do not limit the scope of the present invention.

Measurement of viscoelastic behavior

The viscoelastic behaviors of the resin compositions prepared in Examples and Comparative Examples were studied by measuring a storage elastic modulus G' (dyn/cm$^2$) using RDA-II manufactured by Rheometrics in a temperature range between room temperature and 300° C.

Measurement of melt viscosity

Melt viscosities of the polyester (A), the polymer (B), and the crosslinked material (B') prepared by reacting the polymer (B) and the crosslinking agent (C) were measured using CAPIROGRAPH 1B manufactured by Toyo Seiki Co., Ltd. in a temperature range between 240° C. and 290° C.

Observation and photograph with scanning electron microscope

A sample prepared by press molding the obtained thermoplastic resin composition was mirror polished with a microtome and etched with a 5N aqueous solution of sodium hydroxide at 70° C. for 30 minutes (sometimes referred to as "alkali etching"). The sample was washed with water and dried under reduced pressure at 90° C. for one hour to remove water. The sample was observed and photographed with a scanning electron microscope by a conventional method.

Thereby, the liquid crystalline polyester was removed by the alkali etching and a part of the sample in which the remaining thermoplastic resin remained was observed and photographed.

Examples 1–4 and Comparative Examples 1–4 were carried out by selecting a temperature at which the viscosities were in the order of (B')>(A)>(B).

The maleic anhydride-modified high density polyethylene and liquid crystalline polyester which were used in Examples and Comparative Examples were obtained from the below described formulations, and other ethylene base polymers and styrene base polymers were the following commercially available ones.

1. Commercially available resins

Ethylene-ethyl acrylate-maleic anhydride copolymer:

LX-4110 manufactured by Sumitomo Chemical Co., Ltd. (hereinafter referred to as "E-EA-MAh")

Styrene-maleic anhydride copolymer:

DYLARK (trademark) 232 manufactured by Alco Chemical (hereinafter referred to as "St-MAh")

Styrene-methacrylic acid copolymer:

RYULEX (trademark) A-15 manufactured by Dainippon Ink and Chemicals Co., Ltd. (hereinafter referred to as "St-MAA")

2. Synthesis of maleic anhydride-modified high density polyethylene (hereinafter referred to as "M-HDPE")

To high density polyethylene (IDEMITSU POLYETHYLENE (trademark) 110 J (manufactured by Idemitsu Petrochemical Co., Ltd.) (hereinafter referred to as "HDPE") (10 kg), maleic anhydride (500 g), styrene (50 g) and 1,3-bis(tert.-butylperoxyisopropyl)benzene (10 g) were added and well mixed. Thereafter, the mixture was melt kneaded in a 30 mm twin screw extruder equipped with a vacuum vent (manufactured by Ikegai Co., Ltd.) at a temperature of 180° to 220° C. and pelletized.

3. Synthesis of liquid crystalline polyester (hereinafter referred to as "LCP")

In a polymerization tank equipped with anchor type agitation blades and having a small clearance between a tank wall and the agitation blades, p-hydroxybenzoic acid (596 g, 4.32 moles), terephthalic acid (133 g, 0.8 mole), 4,4'-dihydroxybiphenyl (149 g, 0.8 mole), polyethylene terephthalate (PET SA-1206 manufactured by Unitica) (246 g corresponding to 23.7% by weight of the finally obtained polymer) and acetic anhydride (665 g, 6.52 moles) were charged and heated at 150° C. for one hour in a nitrogen atmosphere while stirring, followed by refluxing at the same temperature for 3 hours.

Acetic acid was removed by increasing the temperature. Finally, the polymerization was carried out under a high shear at 320° C. for 2 hours. Thereafter, the polymerization mixture was gradually cooled to 200° C. while intensively stirring, and the polymer was recovered from the tank.

The polymer was ground and charged in a rotary oven made of aluminum. Then, the polymer was gradually heated up to 230° C. over 6 hours while stirring the powdery polymer in a nitrogen stream by rotating the whole system, and kept at 230° C. for 3 hours. Thereafter, the polymer was cooled to 100° C. or lower and removed from the oven.

A flow temperature of the polymer (LCP) was 250° C.

EXAMPLE 1

The ethylene-ethyl acrylate-maleic anhydride (E-EA-MAh) (60% by weight, 69% by volume) and LCP (40% by weight, 31% by volume) were kneaded in a laboplastomill at 270° C., 200 rpm for 3 minutes. To the mixture, 2,2'-bis-4(4-aminophenoxy)phenylpropane (manufactured by Wakayama Fine Chemical Co., Ltd., hereinafter referred to as "BAPP") (4.5 PHR) was added and the whole mixture was kneaded at 270° C., 100 rpm for 20 minutes. Herein, 1 PHR means 1 part by weight per 100 parts by weight.

After roughly grinding, the mixture was press molded using a press molding machine (manufactured by Shinto Metal Industries, Co., Ltd.), and a part of the molded article was observed and photographed with a scanning electron microscope (SEM, S2300 type manufactured Hitachi Ltd.), and subjected to the viscoelastic behavior measurement using RDA-II.

The samples used in the observation and photographing with the scanning electron microscope and the viscoelastic behavior measurement had sizes of 5×5×2 (mm) and 10×50×2 (mm), respectively.

Figure 1:
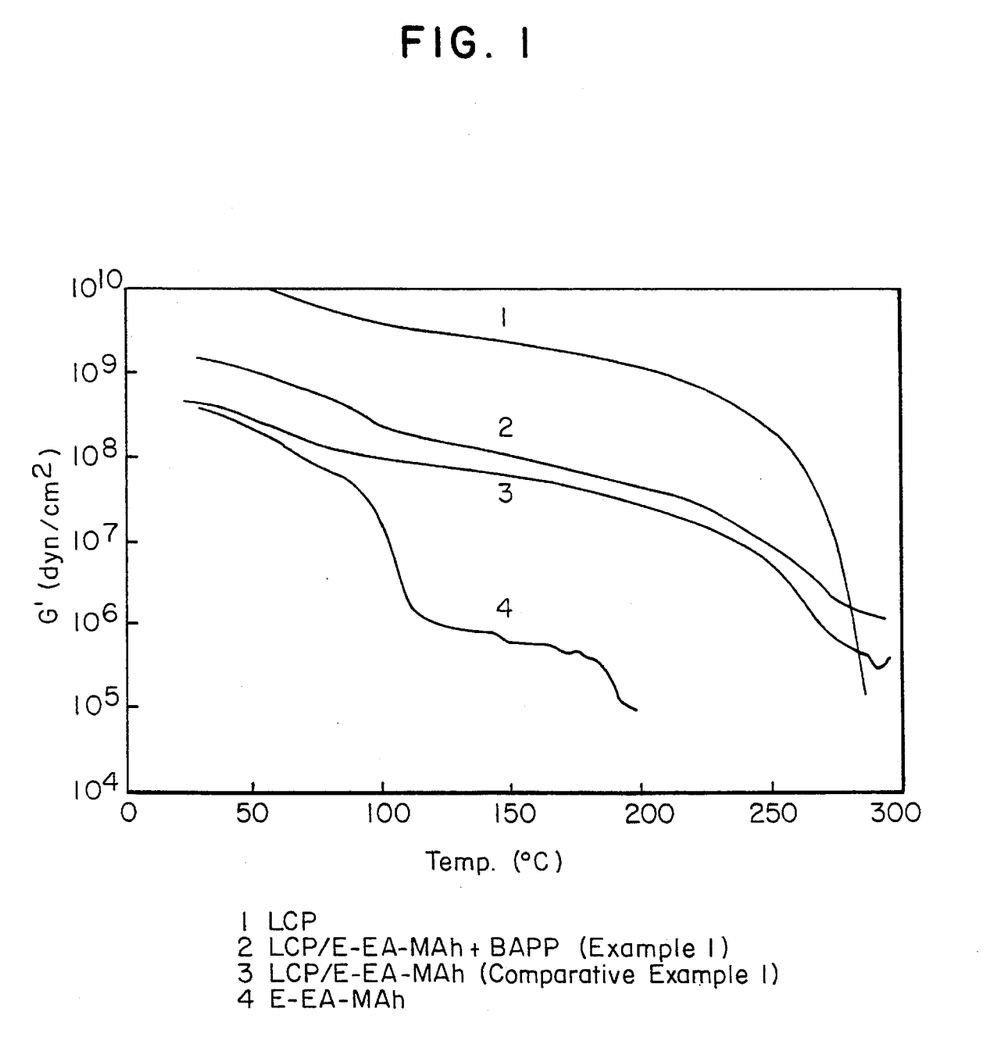
FIG. 1 is a graph showing a storage elastic modulus (G') in a temperature range between room temperature and 300° C., which compares the results 1 (LCP), 2 (Example 1), 3 (Comparative Example 1) and 4 (E-EA-MAh)

The results are shown in Table 1 and FIG. 1.

EXAMPLE 2

The maleic anhydride-modified high density polyethylene (M-HDPE) (60% by weight, 68.8% by volume) and LCP (40% by weight, 31.2% by volume), which were premixed homogeneously, were charged and kneaded in a laboplastomill at 260° C., 200 rpm for 3 minutes. To the mixture, BAPP (2.5 PHR) was added and the whole mixture was kneaded at 260° C., 150 rpm for 20 minutes.

The mixture was press molded and subjected to the observation and photographing with the scanning electron microscope and the viscoelastic behavior measurement in the same manners as in Example 1.

The melt viscosities of the crosslinked M-HDPE, LCP and M-HDPE at 260° C. at a shear rate of 973 sec$^{-1}$ were $2.5\times10^3$ poise, $2.1\times10^3$ poise and $1.9\times10^3$ poise, respectively.

Figure 2:
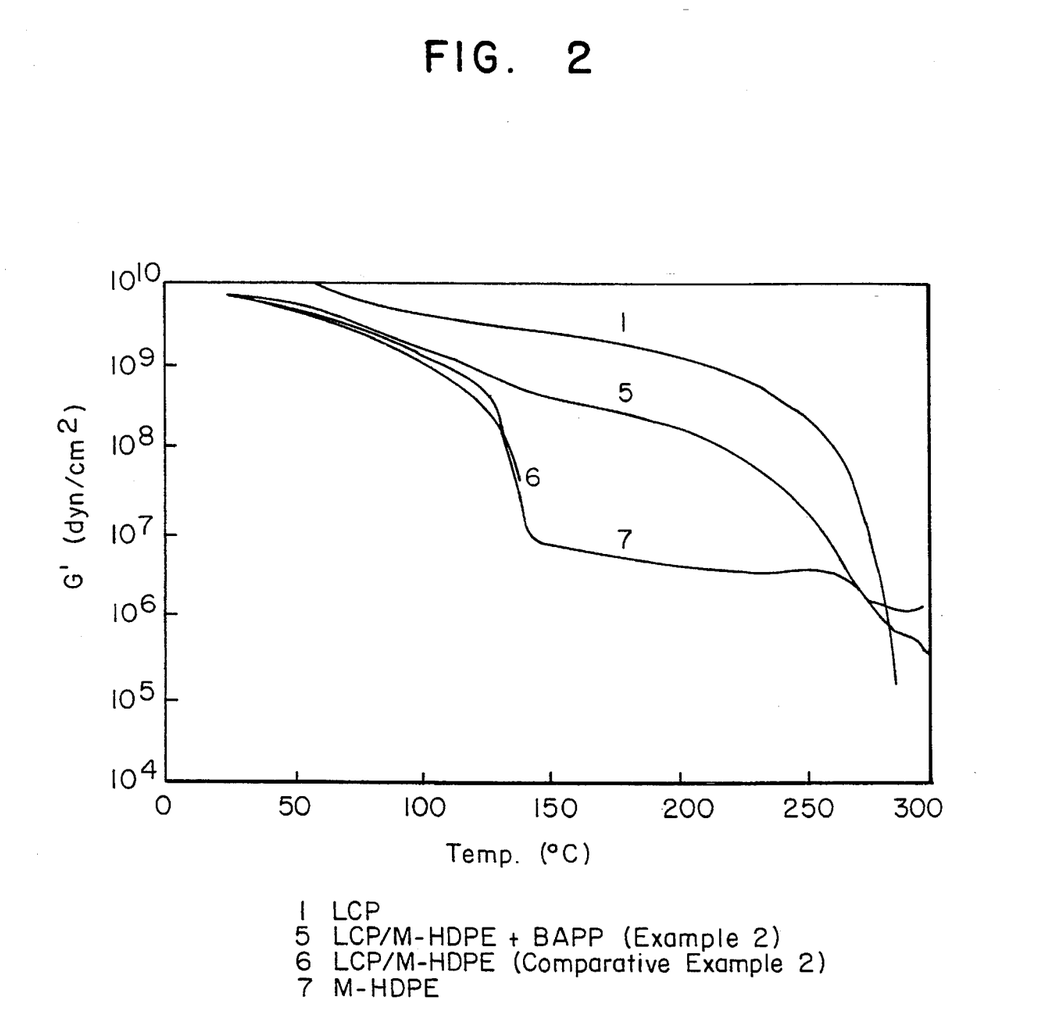
FIG. 2 is a graph showing a storage elastic modulus (G') in a temperature range between room temperature and 300° C., which compares the results 1 (LCP), 5 (Example 2), 6 (Comparative Example 2) and 7 (M-HDPE)

The results are shown in Table 1 and FIG. 2.

Figure 7:
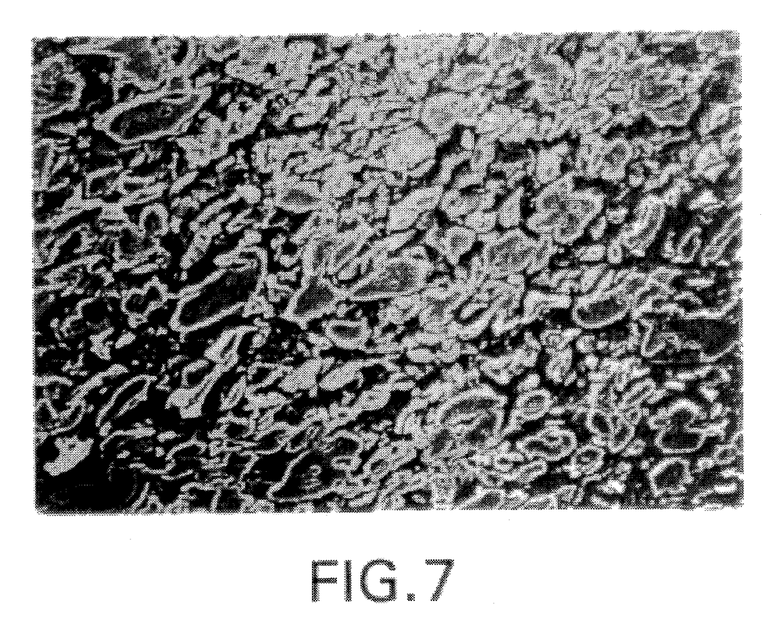
FIG. 7 is a scanning electron microphotograph showing a structure of the thermoplastic resin sample obtained in Example 2 after being alkali etched.

FIG. 7 shows a structure of the thermoplastic resin remaining after removing the liquid crystalline polyester by alkali etching. From this photograph, it is seen that the liquid crystalline polymer phase forms a continuous phase and the thermoplastic resin parts from discontinuous phases.

EXAMPLE 3

In the same manner as in Example 1 except that the styrene-maleic anhydride copolymer (St-MAh) (60% by weight, 66.6% by volume) and LCP (40% by weight, 33.4% by volume), which were premixed homogeneously, were charged and kneaded in a laboplastomill at 260° C., 200 rpm for 3 minutes, BAPP (9 PHR) was added and the whole mixture was kneaded at 260° C., 100 rpm for 15 minutes, the molding and measurements were carried out.

The melt viscosities of the crosslinked St-MAh, LCP and St-MAh at 260° C. were $1.4\times10^3$ poise, $3.1\times10^3$ poise and $1.2\times10^3$ poise, respectively.

Figure 3:
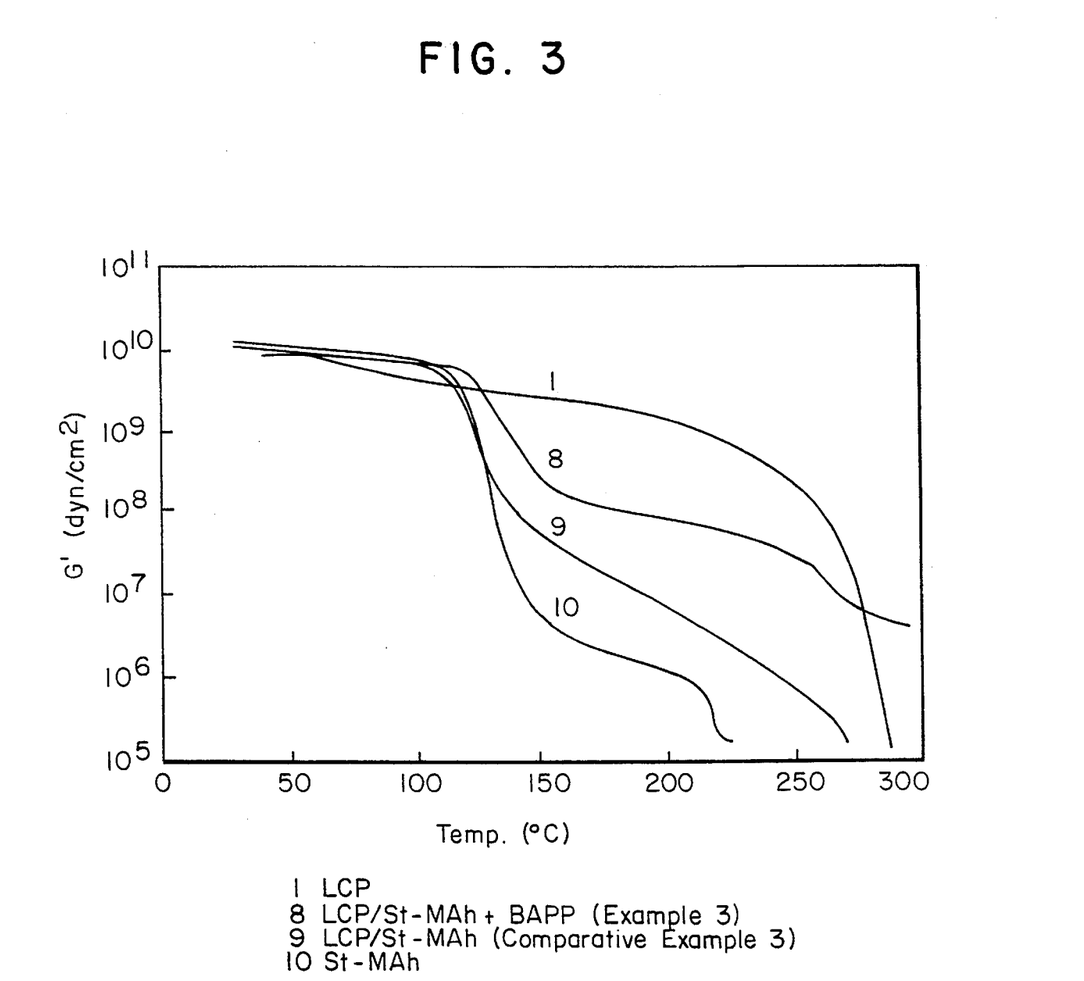
FIG. 3 is a graph showing a storage elastic modulus (G') in a temperature range between room temperature and 300° C., which compares the results 1 (LCP), 8 (Example 8), 9 (Comparative Example 3) and 10 (St-MAh)

The results are shown in Table 1 and FIG. 3.

Figure 8:
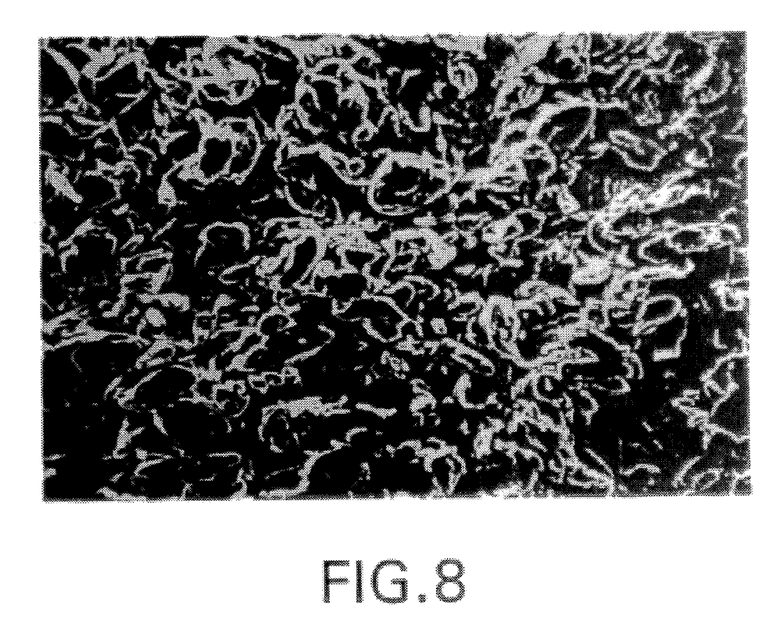
FIG. 8 is a scanning electron microphotograph showing a structure of the thermoplastic resin sample obtained in Example 3 after being alkali etched.

FIG. 8 shows a structure of the thermoplastic resin remaining after removing the liquid crystalline polyester by alkali etching. From this photograph, it is seen that the liquid crystalline polymer phase forms a continuous phase and the thermoplastic resin parts form discontinuous phases.

EXAMPLE 4

In the same manner as in Example 1 except that the styrene-methacrylic acid (St-MAA) (60% by weight, 66.4% by volume) and LCP (40% by weight, 33.6% by volume), which were premixed homogeneously, were charged and kneaded in a laboplastomill at 260° C., 200 rpm for 3 minutes, N,N,N',N'-tetraglycidyldiaminodiphenylmethane (ELM 434 having an epoxy equivalent of 116, manufactured by Sumitomo Chemical Co., Ltd.) (19 PHR) was added and the whole mixture was kneaded at 260° C., 150 rpm for 20 minutes, the molding and measurements were carried out.

Figure 4:
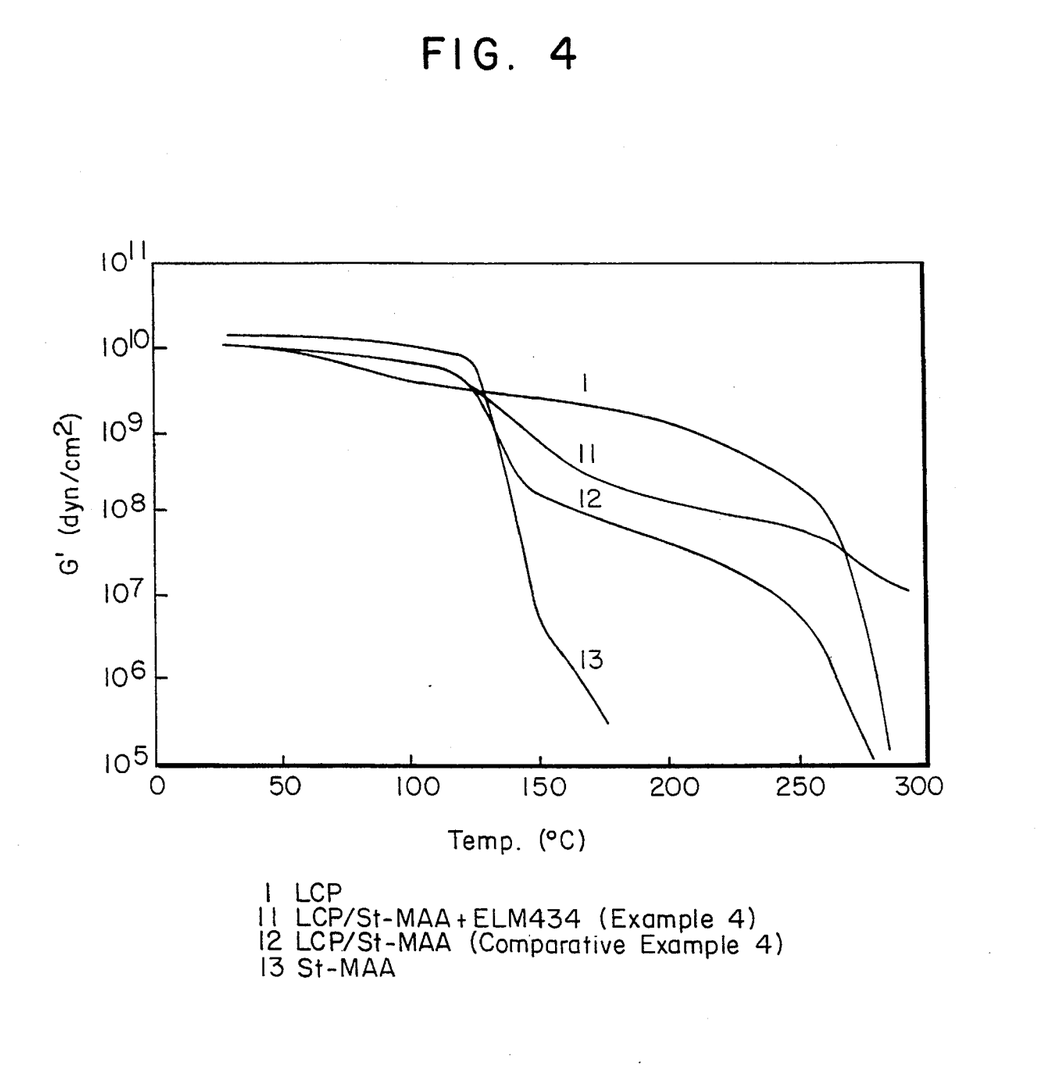
FIG. 4 is a graph showing a storage elastic modulus (G') in a temperature range between room temperature and 300° C., which compares the results 1 (LCP), 11 (Example 4), 12 (Comparative Example 4) and 13 (St-MAA)

The results are shown in Table 1 and FIG. 4.

In Examples 1–4, particle sizes of the dispersed crosslinked polymers were in the range between 50 µm and 1 µm.

EXAMPLE 5

In the same manner as in Example 1 except that the styrene-maleic anhydride (St-MAh) (70% by weight, 75.6% by volume) and LCP (30% by weight, 24.4% by volume), which were premixed homogeneously, were charged and kneaded in a laboplastomill at 260° C., 200 rpm for 3 minutes, BAPP (11.5 PHR) was added and the whole mixture was kneaded at 260° C., 100 rpm for 15 minutes, the molding and measurements were carried out.

Figure 5:
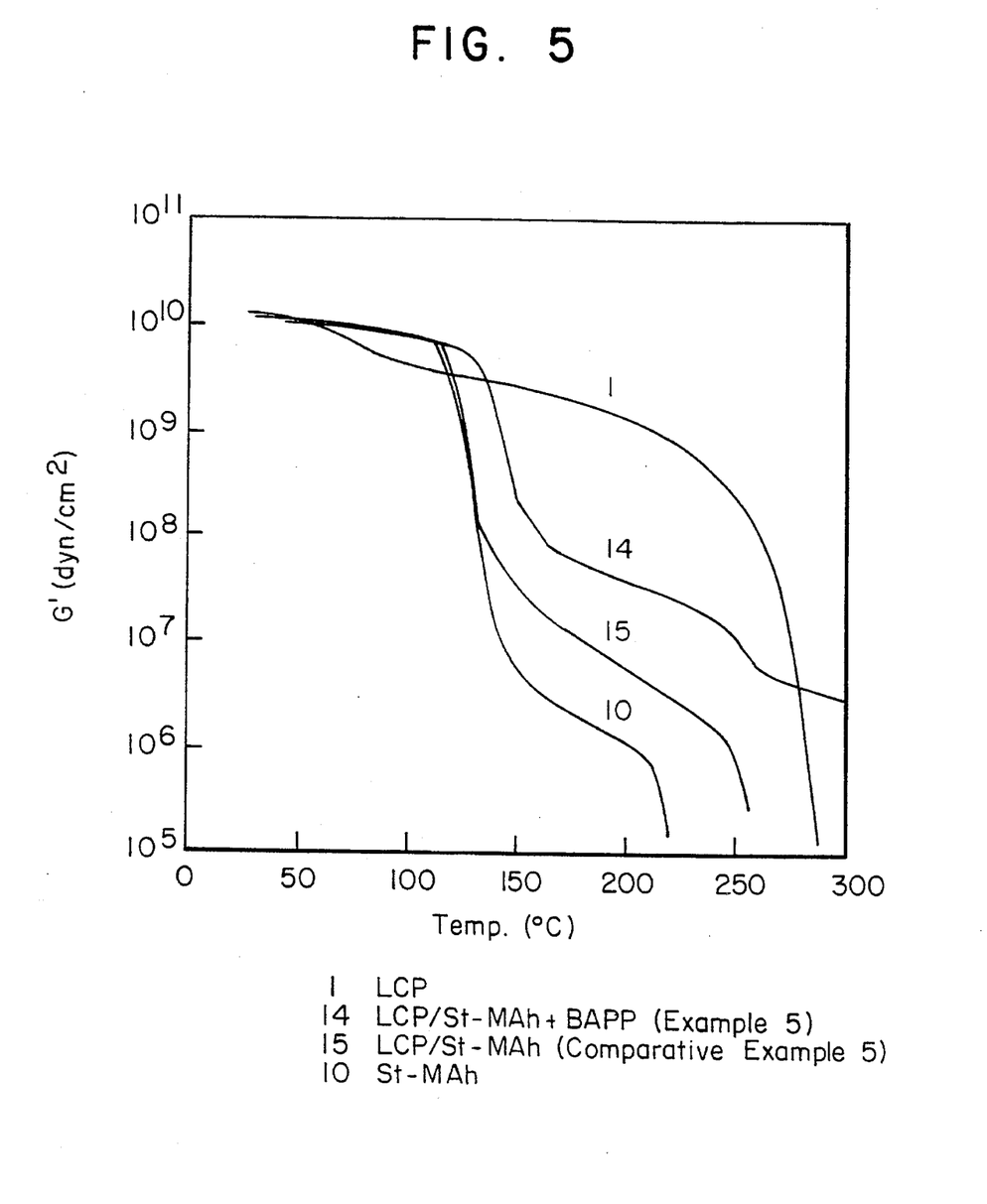
FIG. 5 is a graph showing a storage elastic modulus (G') in a temperature range between room temperature and 300° C., which compares the results 1 (LCP), 14 (Example 5), 15 (Comparative Example 5) and 10 (St-MAh)

The results are shown in Table 1 and FIG. 5.

Reference Example 1

In a one liter separable flask equipped with anchor type agitation blades, ε-caprolactam which had been vacuum dried at 40° C. for 96 hours (180 g) was charged in a nitrogen atmosphere and heated to 80° C. After ε-caprolactam was thoroughly molten, methylenediphenyl 4,4'-diisocyanate (hereinafter sometimes referred to as "MDI") (100 g) was charged. The mixture was gradually heated while stirring in a nitrogen atmosphere and reacted at 108° C. for 2 hours and then at 140° C. for 3 hours. The reaction mixture was cooled to 80° C. and washed with a ten times volume of iced water twice, followed by vacuum drying at 40° C. for 72 hours. A yield of the resulting reaction product of ε-caprolactam and MDI, namely a blocked isocyanate (hereinafter sometimes referred to as "B-MDI") was 91.4%, and its melting point was 179° to 180° C.

EXAMPLE 6

In the same manner as in Example 1 except that the styrene-methacrylic acid (St-MAA) (50% by weight, 56.9% by volume) and LCP (50% by weight, 43.1% by volume), which were premixed homogeneously, were charged and kneaded in a laboplastomill at 260° C., 200 rpm for 3 minutes, the blocked isocyanate (B-MDI) obtained in Reference Example 1 (20.8 PHR) was added and the whole mixture was kneaded at 260° C., 60 rpm for 20 minutes, the molding and the measurements were carried out.

Figure 6:
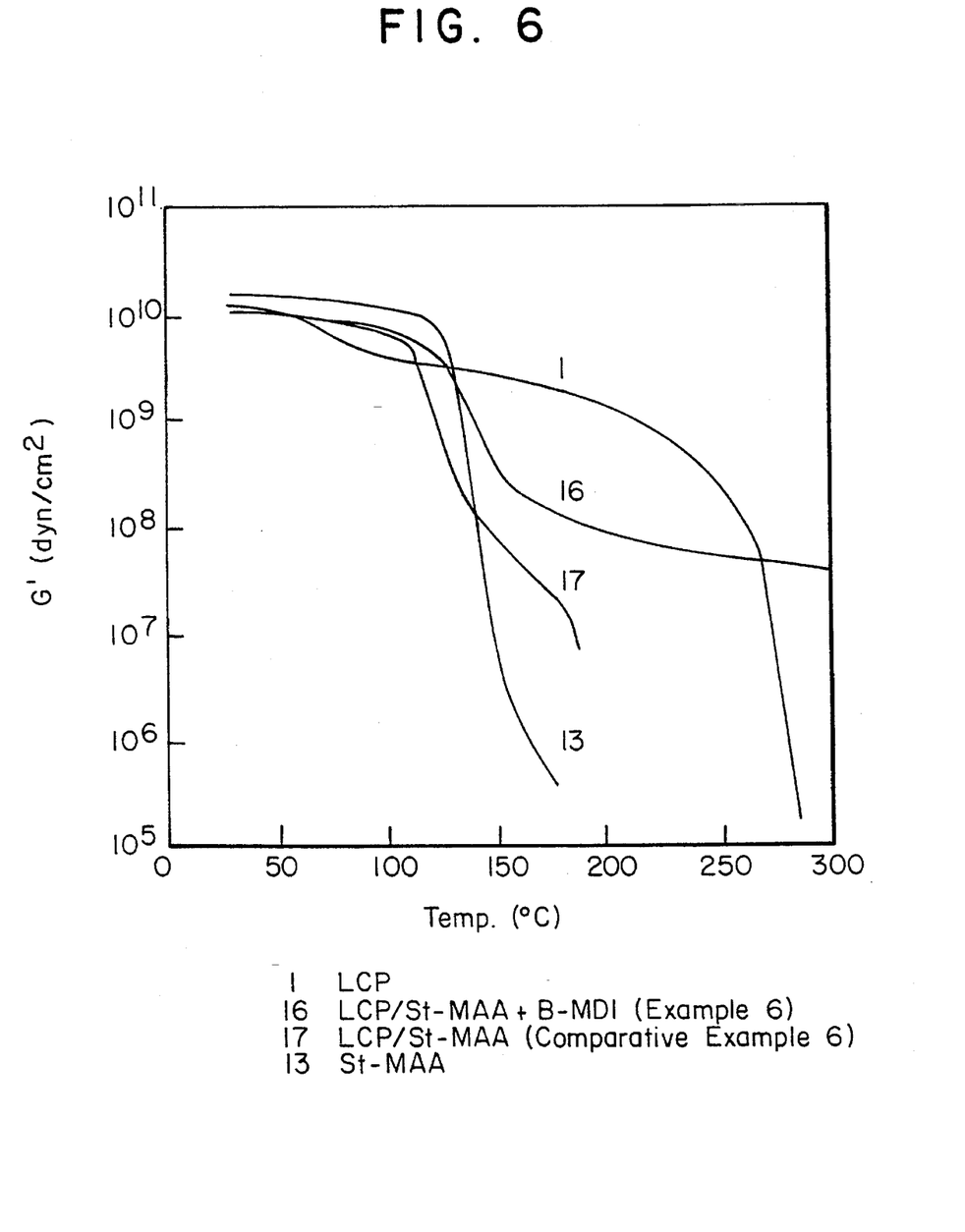
FIG. 6 is a graph showing a storage elastic modulus (G') in a temperature range between room temperature and 300° C., which compares the results 1 (LCP), 16 (Example 6), 17 (Comparative Example 6) and 13 (St-MAA)

The results are shown in Table 1 and FIG. 6.

Comparative Example 1

The ethylene-ethyl acrylate-maleic anhydride (E-EA-MAh) (60% by weight, 69% by volume) and LCP (40% by weight, 31% by volume), which were premixed homogeneously, were charged and melt kneaded in a laboplastomill at 270° C., 200 rpm for 20 minutes, and press molded. A sample of the molded article was observed and photographed with the scanning electron microscope and subjected to the viscoelastic behavior measurement.

The results are shown in Table 1 and FIG. 1.

From FIG. 1, it is understood that the sample obtained in Example 1 had the larger storage elastic modulus (G') than that of the simply blended sample in Comparative Example 1.

Comparative Example 2

The maleic anhydride-modified high density polyethylene (M-HDPE) (60% by weight, 68.8% by volume) and LCP (40% by weight, 31.2% by volume) were charged and melt kneaded in a laboplastomill at 260° C., 200 rpm for 20 minutes, and molded. A sample of the molded article was observed and photographed with the scanning electron microscope and subjected to the viscoelastic behavior measurement.

The results are shown in Table 1 and FIG. 2.

Figure 9:
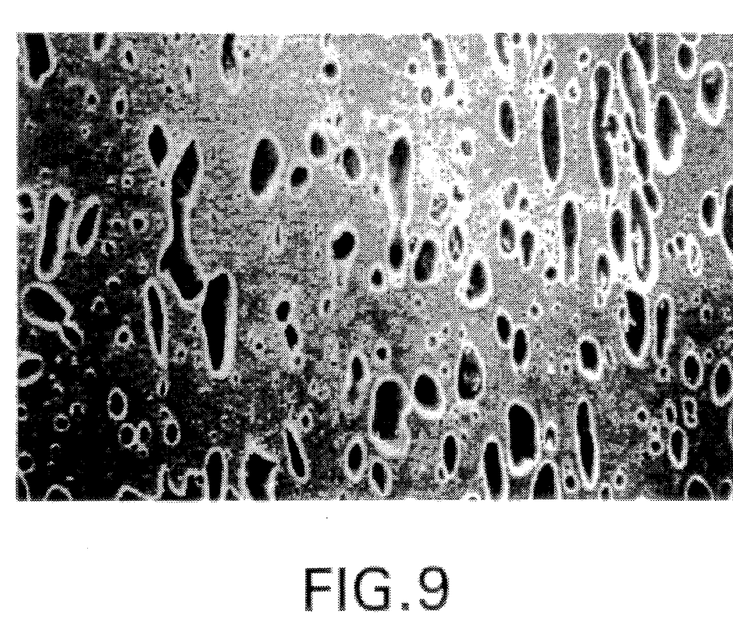
FIG. 9 is a scanning electron microphotograph showing a pore structure of the liquid crystalline polyester sample obtained in Comparative Example 2 after being alkali etched.

FIG. 9 shows a pore structure formed by removing the liquid crystalline polyester after alkali etching. From FIG. 9, it is seen that the removed liquid crystalline polyester phases form the discontinuous phases, while the remaining thermoplastic resin phase forms the continuous phase.

From FIG. 2, it is understood that the sample obtained in Example 2 showed small decrease of the storage elastic modulus (G') than the simply blended LCP/M-HDPE sample in Comparative Example 2 even at high temperature.

Comparative Example 3

The styrene-maleic anhydride copolymer (St-MAh) (60% by weight, 66.8% by volume) and LCP (40% by weight, 33.4% by volume) were melt kneaded in a laboplastomill at 260° C., 200 rpm for 20 minutes, and press molded. A sample of the molded article was observed and photographed with the scanning electron microscope and subjected to the viscoelastic behavior measurement.

The results are shown in Table 1 and FIG. 3.

Figure 10:
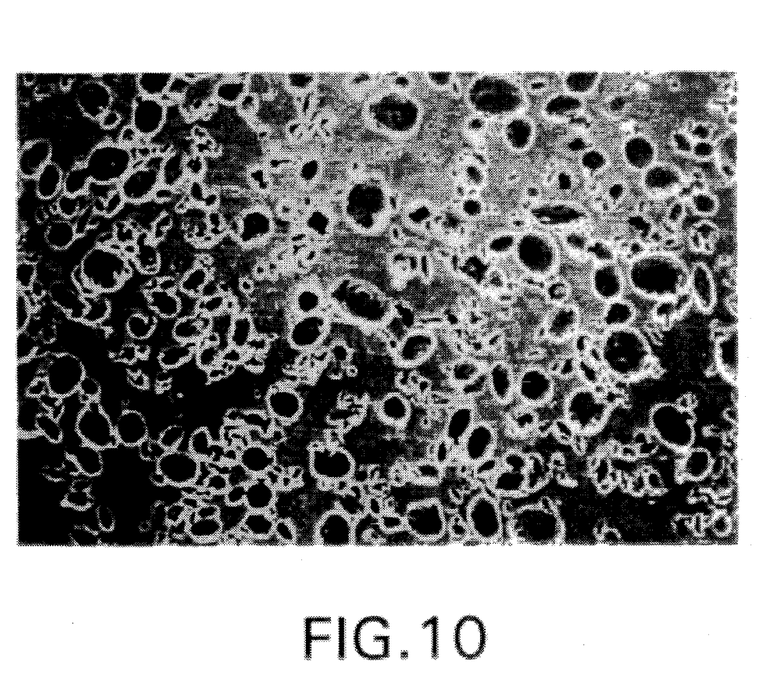
FIG. 10 is a scanning electron microphotograph showing a pore structure of the liquid crystalline polyester sample obtained in Example 3 after being alkali etched.

FIG. 10 shows a pore structure formed by removing the liquid crystalline polyester after alkali etching. From FIG. 10, it is seen that the removed liquid crystalline polyester phases form the discontinuous phases, while the remaining thermoplastic resin phase forms the continuous phase.

From FIG. 3, it is understood that the sample obtained in Example 3 showed small decrease of the storage elastic modulus (G') than the simply blended LCP/St-MAh sample in Comparative Example 3 even at high temperature.

Comparative Example 4

In the same manner as in Comparative Example 1 except that the styrene-methacrylic acid copolymer (St-MAA) (60% by weight, 66.4% by volume) and LCP (40% by weight, 33.6% by volume) were charged and melt kneaded in a laboplastomill at 260° C., 200 rpm for 20 minutes, the molding and measurement were carried out.

The results are shown in Table 1 and FIG. 4.

From FIG. 4, it is understood that the sample obtained in Example 4 showed small decrease of the storage elastic modulus (G') than the simply blended LCP/St-MAA sample in Comparative Example 2 even at high temperature.

Comparative Example 5

In the same manner as in Comparative Example 1 except that the styrene-maleic anhydride copolymer (St-MAh) (70% by weight, 75.6% by volume) and LCP (30% by weight, 24.4% by volume) were charged and melt kneaded in a laboplastomill at 260° C., 200 rpm for 20 minutes, the molding and measurement were carried out.

The results are shown in Table 1 and FIG. 5.

From FIG. 5, it is understood that the sample obtained in Example 5 showed small decrease of the storage elastic modulus (G') than the simply blended LCP/St-MAh sample in Comparative Example 5 even at high temperature.

Comparative Example 6

In the same manner as in Comparative Example 1 except that the styrene-methacrylic acid copolymer (St-MAA) (50% by weight, 56.9% by volume) and LCP (50% by weight, 43.1% by volume) were charged and melt kneaded in a laboplastomill at 260° C., 200 rpm for 20 minutes, the molding and measurement were carried out.

The results are shown in Table 1 and FIG. 6.

From FIG. 6, it is understood that the sample obtained in Example 6 showed small decrease of the storage elastic modulus (G') than the simply blended LCP/St-MAA sample in Comparative Example 6 even at high temperature.

TABLE 1

| Example No. | Polyester (A) Kind | Polyester (A) Vol. % | Polymer (B) Kind | Polymer (B) Vol. % | Crosslinking agent (C) Kind | Crosslinking agent (C) PHR | Presence*) of continuous phase of Polyester (A) |
|---|---|---|---|---|---|---|---|
| 1 | LCP | 31 | E-EA-MAh | 69.0 | BAPP | 4.5 | O |
| 2 | LCP | 31.2 | M-HDPE | 68.8 | BAPP | 2.5 | O |
| 3 | LCP | 33.4 | St-MAh | 66.6 | BAPP | 9 | O |
| 4 | LCP | 33.6 | ST-MAA | 66.4 | ELM434 | 19 | O |
| 5 | LCP | 24.4 | St-MAh | 75.6 | BAPP | 11.5 | O |
| 6 | LCP | 43.1 | ST-MAA | 56.9 | B-MDI | 20.8 | O |
| C. 1 | LCP | 31 | E-EA-MAh | 60.0 | — | — | X |
| C. 2 | LCP | 31.2 | M-HDPE | 68.8 | — | — | X |
| C. 3 | LCP | 33.4 | St-MAh | 66.6 | — | — | X |
| C. 4 | LCP | 33.6 | ST-MAA | 66.4 | — | — | X |
| C. 5 | LCP | 24.4 | St-MAh | 75.6 | — | — | X |
| C. 6 | LCP | 43.1 | ST-MAA | 56.9 | — | — | X |

Note: *) O or X stands for the sample in which the polyester (A) formed or did not form the continuous phase, respectively. Whether or not the component (A) formed the continuous phase was confirmed by the observation with the scanning electron microscope.

What is claimed is:

1. A thermoplastic resin composition comprising (A) a liquid crystalline polyester and a reaction product of (B) a thermoplastic polymer having a crosslinkable functional group and (C) a crosslinking agent, wherein said polymer (B) is at least one polymer selected from the group consisting of (1) a polyolefin which is modified with a compound having a crosslinkable functional group and (2) a copolymer of a compound having a crosslinkable functional group with at least one compound selected from the group consisting of olefins, olefinically unsaturated compounds and aromatic vinyl compounds, said crosslinking agent (C) is at least one compound selected from the group consisting of amines, carboxylic acids, epoxy compounds and isocyanates which have at least two functional groups, a volume ratio of said polyester (A) to said polymer (B) is from 20:80 to 50:50, an amount of said crosslinking agent (C) is from 0.01 to 50 parts by weight per 100 parts by weight of said polymer (B), and said polyester forms a continuous phase.

2. The thermoplastic resin composition according to claim 1, wherein a crosslinked product of said polymer (B) with said crosslinking agent (C) forms a discontinuous phase.

3. The thermoplastic resin composition according to claim 1, wherein said liquid crystalline polyester (A) has a flow temperature of 160° to 350° C., when determined by the following method:

Flow temperature being a temperature at which a melt viscosity reaches 48,000 poise when a resin melt is extruded from a nozzle having an inner diameter of 1 mm and a length of 10 mm of a capillary rheometer under a load of 100 kg/cm$^2$ while heating at a heating rate of 4° C./min.

4. The thermoplastic resin composition according to claim 1, wherein said liquid crystalline polyester is a polyester comprising a repeating unit (III), or repeating units (I) and (II), or (I), (II) and (III):

$$-(\overset{O}{\underset{\|}{C}}-R_1-\overset{O}{\underset{\|}{C}})- \quad (I)$$

$$-(O-R_2-O)- \quad (II)$$

$$-(O-R_3-\overset{O}{\underset{\|}{C}})- \text{ or } -(O-R_2-O-\overset{O}{\underset{\|}{C}}-R_1-\overset{O}{\underset{\|}{C}})- \quad (III)$$

wherein $R_1$ is at least one group selected from the group consisting of $R_2$ is at least one group selected from the group consisting of -continued and $R_3$ is at least one group selected from the group consisting of provided that a part of hydrogen atoms on a benzene ring of the aromatic hydrocarbon group in any of $R_1$, $R_2$ and $R_3$ may be substituted by a halogen atom, an aryl group, or a $C_1$-$C_{10}$ alkyl or alkoxy group.

5. The thermoplastic resin composition according to claim 4, wherein a dicarboxylic acid which provides the repeating unit (I) is at least one acid selected from the group consisting of terephthalic acid, isophthalic acid and biphenyl-4,4'-dicarboxylic acid; a dihydroxy compound which provides the repeating unit (II) is at least one compound selected from the group 4,4'-dihydroxybiphenyl, hydroquinone and resorcinol; and a hydroxycarboxylic acid which provides the repeating unit (III) is at least one acid selected from the group consisting of p-hydroxybenzoic acid and 2-hydroxy-6-naphthoic acid.

6. The thermoplastic resin composition according to claim 1, wherein said compound having the crosslinkable functional group is a compound having both (a) at least one bond selected from the group consisting of a carbon-carbon double bond and carbon-carbon triple bond and (b) at least one functional group selected from the group consisting of a carboxylic acid group, an acid anhydride group, an acid amide group, an imide group, an epoxy group and a carboxylic acid ester group.

* * * * *